(12) United States Patent
Nakanoya

(10) Patent No.: US 10,261,805 B2
(45) Date of Patent: Apr. 16, 2019

(54) INFORMATION PROCESSING APPARATUS FOR ACQUIRING AND CLASSIFYING COMPONENTS IN A CONFIGURATION DEFINITION, INFORMATION PROCESSING METHOD, AND RECORDING MEDIUM

(71) Applicant: NEC Corporation, Tokyo (JP)

(72) Inventor: Manabu Nakanoya, Tokyo (JP)

(73) Assignee: NEC Corporation, Minatio-ku, Tokyo (JP)

( * ) Notice: Subject to any disclaimer, the term of this patent is extended or adjusted under 35 U.S.C. 154(b) by 0 days.

(21) Appl. No.: 15/517,666

(22) PCT Filed: Oct. 7, 2015

(86) PCT No.: PCT/JP2015/005097
§ 371 (c)(1),
(2) Date: Apr. 7, 2017

(87) PCT Pub. No.: WO2016/056236
PCT Pub. Date: Apr. 14, 2016

(65) Prior Publication Data
US 2017/0308391 A1 Oct. 26, 2017

(30) Foreign Application Priority Data
Oct. 8, 2014 (JP) .................................. 2014-206949

(51) Int. Cl.
*G06F 9/44* (2018.01)
*G06F 9/445* (2018.01)
(Continued)

(52) U.S. Cl.
CPC ............ *G06F 9/44505* (2013.01); *G06F 8/36* (2013.01); *G06F 9/45558* (2013.01);
(Continued)

(58) Field of Classification Search
None
See application file for complete search history.

(56) References Cited

U.S. PATENT DOCUMENTS 8,312,445 B2 * 11/2012 Craft .......................... G06F 8/61
717/169
9,817,680 B1 * 11/2017 Floyd .................. G06F 9/44505
(Continued)

FOREIGN PATENT DOCUMENTS

JP 06-243131 A 9/1994
JP 08-329079 A 12/1996
(Continued)

OTHER PUBLICATIONS

Written Opinion of the International Searching Authority of PCT/JP2015/005097 dated Dec. 28, 2015.
(Continued)

*Primary Examiner* — Insun Kang
(74) *Attorney, Agent, or Firm* — Sughrue Mion, PLLC

(57) ABSTRACT

A difference in configuration definition between different systems is efficiently extracted. A difference detection device (100) includes a configuration definition acquisition unit (110) and a configuration comparison unit (140). The configuration definition acquisition unit (110) acquires, with respect to different systems, configuration definitions (210) each including components of a system and a reference relation between the components. The configuration comparison unit (140) classifies, based on the reference relation between the components in configuration definition (210) of each of the different systems, the components in each configuration definition (210) into a common component and a difference component between the different systems, and outputs a result of classification.

8 Claims, 17 Drawing Sheets

(51) Int. Cl.
  *G06F 8/36*    (2018.01)
  *G06K 9/62*    (2006.01)
  *G06F 9/455*   (2018.01)
  *G06F 9/50*    (2006.01)

(52) U.S. Cl.
  CPC .......... *G06F 9/5077* (2013.01); *G06K 9/628* (2013.01); *G06K 9/6267* (2013.01)

(56) References Cited

U.S. PATENT DOCUMENTS

| | | | |
|---|---|---|---|
| 2005/0154747 A1* | 7/2005 | Kii | G06F 17/30038 |
| 2006/0168182 A1* | 7/2006 | Fuller, III | H04L 67/36 |
| | | | 709/223 |
| 2008/0104581 A1* | 5/2008 | Clemm | G06F 8/71 |
| | | | 717/162 |
| 2009/0216990 A1* | 8/2009 | Vick | G06F 9/44505 |
| | | | 711/172 |
| 2012/0221315 A1 | 8/2012 | Yanoo | |
| 2013/0007708 A1 | 1/2013 | Sakaki et al. | |
| 2013/0067435 A1* | 3/2013 | Huang | G06F 8/33 |
| | | | 717/121 |
| 2013/0254741 A1* | 9/2013 | Spassov | G06F 8/71 |
| | | | 717/110 |
| 2014/0082602 A1* | 3/2014 | Mallur | G06F 8/63 |
| | | | 717/171 |
| 2014/0108649 A1* | 4/2014 | Barton | G06F 9/45533 |
| | | | 709/224 |
| 2015/0033217 A1* | 1/2015 | Mellor | H04L 63/102 |
| | | | 717/171 |

FOREIGN PATENT DOCUMENTS

| | | |
|---|---|---|
| JP | 2014-081886 A | 5/2014 |
| WO | 2008/092989 A1 | 8/2008 |
| WO | 2011/052148 A1 | 5/2011 |
| WO | 2011/115024 A1 | 9/2011 |
| WO | 2014/006739 A1 | 1/2014 |

OTHER PUBLICATIONS

International Search Report of PCT/JP2015/005097 dated Dec. 28, 2015.

\* cited by examiner

Fig. 8

SYSTEM A /210

AP_A
  Type: Server
  CPU: 1core
  Mem: 4G
  ipAddress: 192.168.0.1
  vlan: VLan_A DB_A
  Type: Server
  CPU: 2core
  Mem: 8G
  ipAddress: 192.168.0.2
  vlan: VLan_A Monitor_A
  Type: Server
  CPU: 1core
  Mem: 1G
  ipAddress: 192.168.0.100

VLan_A
  Type: VLan
  id: 10
  cidr: 192.168.0.0/24

SYSTEM B /210

AP_B1
  Type: Server
  CPU: 1core
  Mem: 2G
  ipAddress: 192.168.0.1
  vlan: VLan_B AP_B2
  Type: Server
  CPU: 1core
  Mem: 2G
  ipAddress: 192.168.0.2
  vlan: VLan_B DB_B
  Type: Server
  CPU: 4core
  Mem: 8G
  ipAddress: 192.168.0.3
  vlan: VLan_B VLan_B
  Type: VLan
  id: 10
  cidr: 192.168.0.0/24

| COMPONENT DIVISION REFERENCE | BLANK LINE |
|---|---|
|  | : |
| REFERENCE ITEM | vlan |
|  | : |

Fig. 11

| COMPARISON BASE COMPONENT | COMPARISON TARGET COMPONENT | SIMILARITY | MATCHING CANDIDATE |
|---|---|---|---|
| AP_A | AP_B1 | 0.9 | yes |
| AP_A | AP_B2 | 0.8 | yes |
| AP_A | DB_B | 0.6 | yes |
| DB_A | AP_B1 | 0.6 | yes |
| DB_A | AP_B2 | 0.6 | yes |
| DB_A | DB_B | 0.9 | yes |
| Monitor_A | AP_B1 | 0.2 | no |
| Monitor_A | AP_B2 | 0.3 | no |
| Monitor_A | DB_B | 0.2 | no |
| VLan_A | VLan_B | 0.9 | yes |

Fig. 12

| SELECTION PATTERN |
|---|
| AP_B1, AP_B2 |
| AP_B1, DB_B |
| AP_B2, DB_B |

Fig. 13

| SELECTION PATTERN (COMPARISON TARGET COMPONENT) | MATCHING CANDIDATE | | SIMILARITY | SIMILARITY (AVERAGE) |
|---|---|---|---|---|
| | COMPARISON BASE COMPONENT | COMPARISION TARGET COMPONENT | | |
| AP_B1, AP_B2 | AP_A | AP_B1 | 0.9 | 0.75 |
| | DB_A | AP_B2 | 0.6 | |
| | AP_A | AP_B2 | 0.8 | 0.70 |
| | DB_A | AP_B1 | 0.6 | |
| AP_B1, DB_B | AP_A | AP_B1 | 0.9 | 0.90 (SUCCESSFUL MATCHING) |
| | DB_A | DB_B | 0.9 | |
| | AP_A | DB_B | 0.6 | 0.60 |
| | DB_A | AP_B1 | 0.6 | |
| AP_B2, DB_B | AP_A | AP_B2 | 0.8 | 0.85 |
| | DB_A | DB_B | 0.9 | |
| | AP_A | DB_B | 0.6 | 0.60 |
| | DB_A | AP_B2 | 0.6 | |

Fig. 14

| COMPARISON BASE COMPONENT | COMPARISION TARGET COMPONENT | DETERMINATION RESULT |
|---|---|---|
| AP_A | AP_B1 | SUCCESSFUL MATCHING (COMMON COMPONENT) |
| DB_A | DB_B | SUCCESSFUL MATCHING (COMMON COMPONENT) |
| VLan_A | VLan_B | SUCCESSFUL MATCHING (COMMON COMPONENT) |
| Monitor_A | — | UNSUCCESSFUL MATCHING (DIFFERENCE COMPONENT) |
| — | AP_B2 | UNSUCCESSFUL MATCHING (DIFFERENCE COMPONENT) |

Fig. 15

| COMPARISON BASE COMPONENT | COMPARISION TARGET COMPONENT | SETTING ITEM | COMPARISON BASE SETTING VALUE | COMPARISON TARGET SETTING VALUE |
|---|---|---|---|---|
| AP_A | AP_B1 | Mem | 4G | 2G |
| DB_A | DB_B | CPU | 2core | 4core |
| : | : | : | : | : |

INFORMATION PROCESSING APPARATUS FOR ACQUIRING AND CLASSIFYING COMPONENTS IN A CONFIGURATION DEFINITION, INFORMATION PROCESSING METHOD, AND RECORDING MEDIUM

CROSS REFERENCE TO RELATED APPLICATIONS

This application is a National Stage of International Application No. PCT/JP2015/005097 filed Oct. 7, 2015, claiming priority based on Japanese Patent Application No. 2014-206949 filed Oct. 8, 2014, the contents of all of which are incorporated herein by reference in their entirety.

TECHNICAL FIELD

The present invention relates to an information processing apparatus, an information processing method, and a recording medium.

BACKGROUND ART

Over recent years, configuration information of information systems has been actively described and managed as structured documents. Specifically, to deploy information systems in a cloud infrastructure, pieces of configuration information relating to components constituting the information systems such as a VM (Virtual Machine) and a network have been widely managed as configuration definition files. In this case, the configuration definition files are collectively described, for example, in an XML (Extensible Markup Language) or JSON (JaveScript (Registered Trademark) Object Notation) format.

These configuration definition files are structured documents and therefore have general handling advantages (ease in partial cutout, copy, reuse, and the like) in a structured document. Therefore, typified configuration definition files of information systems are merged (integrated), and thereby it is possible to relatively easily generate a configuration definition file of a complex information system in accordance with individual requirements and to construct the information system.

However, to merge a plurality of configuration definition files, it is necessary to determine, between the configuration definition files, a component (a common component) to be a coupling point for connecting these files. To detect an appropriate coupling point, it is necessary to understand a role of a component defined in a configuration definition file of each information system, resulting in an increase in workload. Further, in a large-scale information system, there are a huge number of determination targets for coupling points in a configuration definition file, and therefore it is difficult to detect the coupling points. Therefore, it is desirable to generate, with a given quantity of work regardless of a scale of an information system, a configuration definition of a new information system by a combination (reuse) of existing configuration definition files.

It is conceivable that an analysis technique for finding a coupling point between configuration definition files is a technique for detecting a similarity or a difference between text documents. As such a difference detection technique for text documents, for example, a DIFF command of a UNIX (Registered Trademark) system is known. The DIFF command compares two text files on a line-by-line basis and presents changed lines and added lines. Further, PTL 1 discloses, as a difference detection technique of structured documents, a technique for using structure information of structured documents. The difference extraction apparatus of PTL 1 represents documents using tree structures based on tags of HTML (Hyper Text Markup Language), compares the documents between corresponding nodes on the tree structures in accordance with comparison references provided for the tags, and performs difference extraction.

As a related technique, PTL 2 discloses a technique for integrating structured documents having the same logic structure. Further, PTL 3 discloses a technique for providing a reference relation between components in a document and using the reference relation upon component correction.

CITATION LIST

Patent Literature

[PTL 1] Japanese Patent Application Laid-open Publication No. H8-329079
[PTL 2] Japanese Patent Application Laid-open Publication No. 2014-081886
[PTL 3] Japanese Patent Application Laid-open Publication No. H6-243131

SUMMARY OF INVENTION

Technical Problem

A text-based comparison system represented by the above-described DIFF command extracts a difference between character strings described in documents but does not extract a difference between units having certain meanings in the documents. Therefore, when the DIFF command is applied between configuration definition files of information systems, it is necessary for a user to analyze a difference between configurations of the information systems, using a character string extracted as a difference.

Further, it is possible for the above-described technique disclosed in PTL 1 to extract a difference on tree structures, but it is difficult for the technique to extract a difference between configuration definition files that are not represented by the tree structures. Therefore, it is difficult to apply the technique disclosed in PTL 1 to extraction of a difference between configuration definition files of information systems.

An object of the present invention is to solve the above-described problems and to provide an information processing apparatus, an information processing method, and a recording medium capable of efficiently extracting a difference between configuration definition files of information systems.

Solution to Problem

An information processing apparatus according to an exemplary aspect of the present invention includes: configuration definition acquisition means for acquiring, with respect to different systems, configuration definitions each including components of a system and a reference relation between the components; and configuration comparison means for classifying, based on the reference relation between the components in the configuration definition of each of the different systems, the components in the configuration definition of each of the different systems into a common component and a difference component between the different systems, and outputting a result of classification.

An information processing method according to an exemplary aspect of the present invention includes: acquiring, with respect to different systems, configuration definitions each including components of a system and a reference relation between the components; and classifying, based on the reference relation between the components in the configuration definition of each of the different systems, the components in the configuration definition of each of the different systems into a common component and a difference component between the different systems, and outputting a result of classification.

A computer readable storage medium according to an exemplary aspect of the present invention records thereon a program causing a computer to perform a method including: acquiring, with respect to different systems, configuration definitions each including components of a system and a reference relation between the components; and classifying, based on the reference relation between the components in the configuration definition of each of the different systems, the components in the configuration definition of each of the different systems into a common component and a difference component between the different systems, and outputting a result of classification.

Advantageous Effects of Invention

An advantageous effect of the present invention is to efficiently extract a difference between configuration definition files of information systems.

BRIEF DESCRIPTION OF DRAWINGS

FIG. 8 is a diagram illustrating an example of a configuration definition 210 in the first example embodiment of the present invention.

FIG. 9 is a diagram illustrating an example of schema information 121 in the first example embodiment of the present invention.

FIG. 11 is a diagram illustrating an example of a calculation result of similarities in the first example embodiment of the present invention.

FIG. 12 is a diagram illustrating an example of selection patterns in the first example embodiment of the present invention.

FIG. 13 is a diagram illustrating an example of a calculation result of similarity for each selection pattern in the first example embodiment of the present invention.

FIG. 14 is a diagram illustrating an example of matching determination results in the first example embodiment of the present invention.

FIG. 15 is a diagram illustrating an example of difference extraction results in the first example embodiment of the present invention.

DESCRIPTION OF EMBODIMENTS

Figure 1:
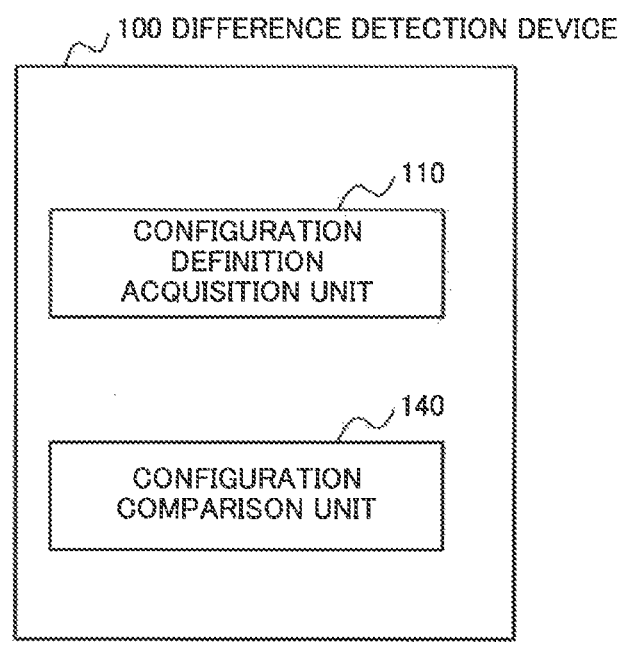
FIG. 1 is a block diagram illustrating a characteristic configuration of a first example embodiment of the present invention.

Example embodiments of the present invention will be described in detail with reference to the accompanying drawings. In the drawings and the example embodiments described in the description, the same components are assigned with the same reference signs, and therefore description thereof will be omitted if appropriate. Further, a direction of an arrow in the drawings indicates one example and does not limit the example embodiments of the present invention.

First Example Embodiment

A first example embodiment of the present invention will be described.

First, a configuration of the first example embodiment of the present invention will be described.

Figure 2:
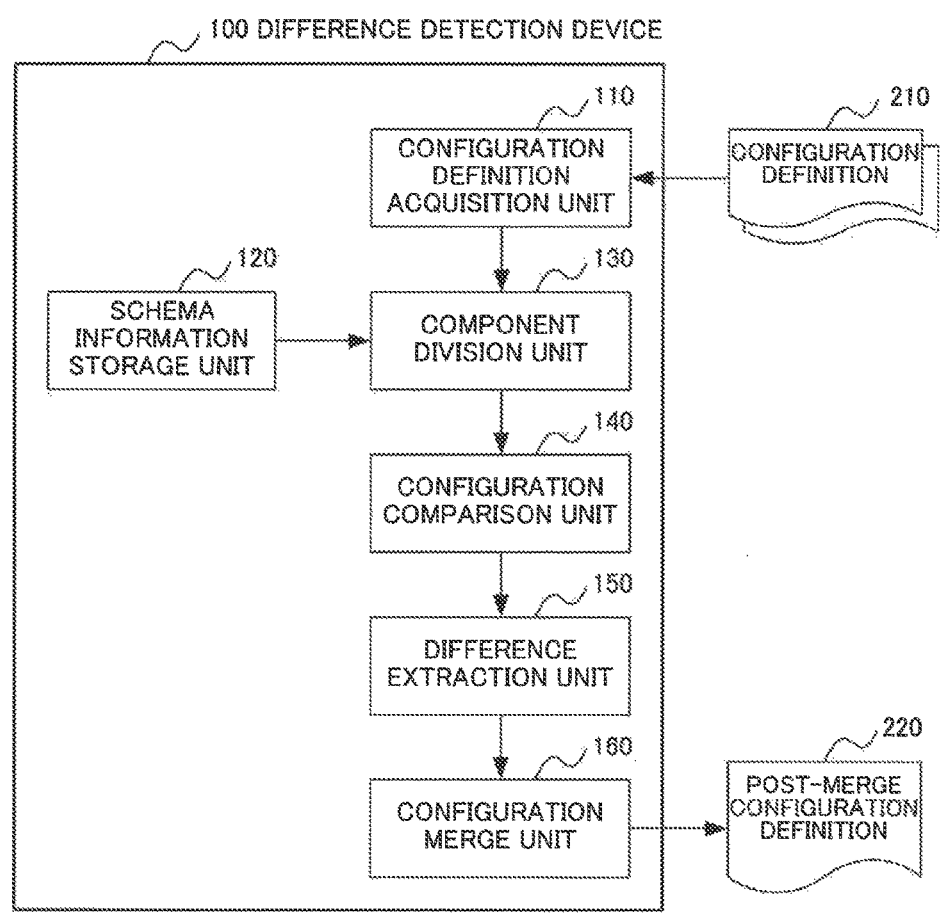
FIG. 2 is a block diagram illustrating a configuration of a difference detection device 100 in the first example embodiment of the present invention.

FIG. 2 is a block diagram illustrating a configuration of a difference detection device 100 in the first example embodiment of the present invention. The difference detection device 100 is one example embodiment of the information processing apparatus of the present invention.

Referring to FIG. 2, the difference detection device 100 in the first example embodiment of the present invention includes a configuration definition acquisition unit 110, a schema information storage unit 120, a component division unit 130, a configuration comparison unit 140, a difference extraction unit 150, and a configuration merge unit 160.

The configuration definition acquisition unit 110 receives, from a user or the like, inputting of configuration definition files (hereinafter, simply described also as configuration definitions 210) of two systems that are merge targets. The configuration definition 210 indicates components constituting a system, setting items of each component and values (setting values) of the setting items, and a reference relation between the components.

FIG. 8 is a diagram illustrating an example of the configuration definition 210 in the first example embodiment of the present invention. In the example of FIG. 8, configuration information of each component is divided by a blank line. In the first line of the configuration information of each component, an identifier of a component is indicated, and in the second line and the following lines, setting items and setting values of the component are indicated. For example, the configuration definition 210 of a system A includes components "AP_A", "DB_A", "Monitor_A", and "VLan_A". The component "AP_A" indicates a component of an identifier "AP_A". The component "AP_A" includes setting items "Type", "CPU", "Mem", "ipAddress", and "vlan". In the setting items of each component, a setting item "Type" indicating a type (a role on the system) of the component is included. As a setting value of the setting item "Type", for example, "Server", "VLan", "Storage", or the like is used.

Further, in the example of FIG. 8, the setting item "vlan" is a reference item. The reference item indicates that a component including the reference item depends on another component (refers to another component) represented by a setting value of the reference item and the another component is needed for operations of the component. In the example of FIG. 8, the components "AP_A" and "DB_A" refer to the component "VLan_A".

In the example embodiments of the present invention, a relation between components of a reference base and a reference target indicated by such a reference item is referred to as a reference relation.

The schema information storage unit 120 stores schema information 121.

The schema information 121 indicates, information relating to a grammar of a configuration definition 210, such as a division reference of components in the configuration definition 210, and a setting item being a reference item among setting items of each component.

FIG. 9 is a diagram illustrating an example of the schema information 121 in the first example embodiment of the present invention. In the example of FIG. 9, as a division reference of components, "blank line" is designated. Further, as a reference item, "vlan" is set. It is noted that when a configuration definition 210 is described in an XML format, a specific tag may be designated as the division reference.

The component division unit 130 divides configuration definitions 210 of respective systems into pieces of configuration information of component units.

The configuration comparison unit 140 compares configuration definitions 210 subjected to the division and classifies the components of the respective systems into a component (a common component) to be a coupling point upon merge and a difference component other than the common component. In the example embodiments of the present invention, extraction of a common component is referred to as matching. A pair of components determined as successful matching is classified into a common component, and components determined as unsuccessful matching are classified into difference components.

The difference extraction unit 150 extracts, for a pair of components determined as a common component, a setting item that is conflicting (setting values are different).

The configuration merge unit 160 merges configuration definitions 210 of two systems based on the matching determination result obtained by the configuration comparison unit 140 and the difference extraction result obtained by the difference extraction unit 150.

The difference detection device 100 may be a computer that includes a CPU (Central Processing Unit) and a storage medium storing a program and operates by control based on the program.

Figure 3:
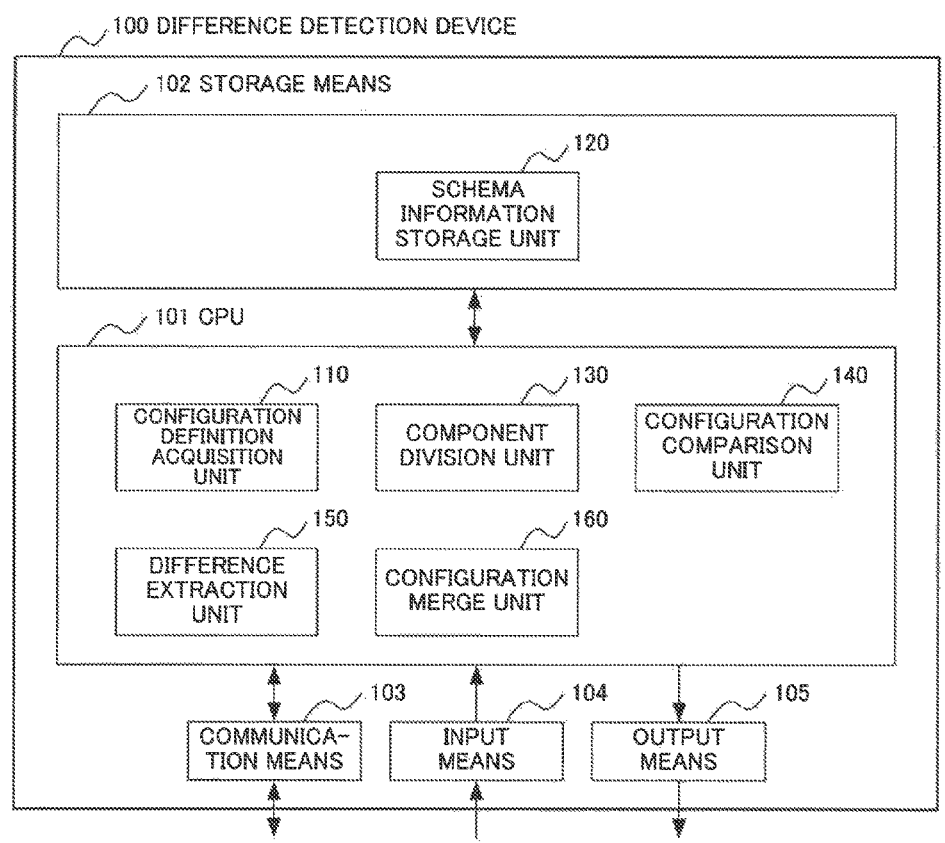
FIG. 3 is a block diagram illustrating a configuration of the difference detection device 100 realized by a computer in the first example embodiment of the present invention.

FIG. 3 is a block diagram illustrating a configuration of the difference detection device 100 realized by a computer in the first example embodiment of the present invention.

The difference detection device 100 includes a CPU 101, storage means (a storage medium) 102 such as a hard disk, or a memory, communication means 103 for communicating with another device and the like, input means 104 such as a keyboard, and output means 105 such as a display. The CPU 101 executes a computer program for implementing functions of the configuration definition acquisition unit 110, the component division unit 130, the configuration comparison unit 140, the difference extraction unit 150, and the configuration merge unit 160. The storage means 102 stores data (schema information 121) of the schema information storage unit 120. The input means 104 receives inputting of configuration definitions 210 from the user or the like. The output means 105 outputs a matching determination result, a difference extraction result, and a post-merge configuration definition 220 to the user or the like. Alternatively, the communication means 103 may receive configuration definitions 210 from another device and output a matching determination result, a difference extraction result, and a post-merge configuration definition 220 to the another device and the like.

The components of the difference detection device 100 may be independent logic circuits.

Next, the operation of the first example embodiment of the present invention will be described.

Figure 4:
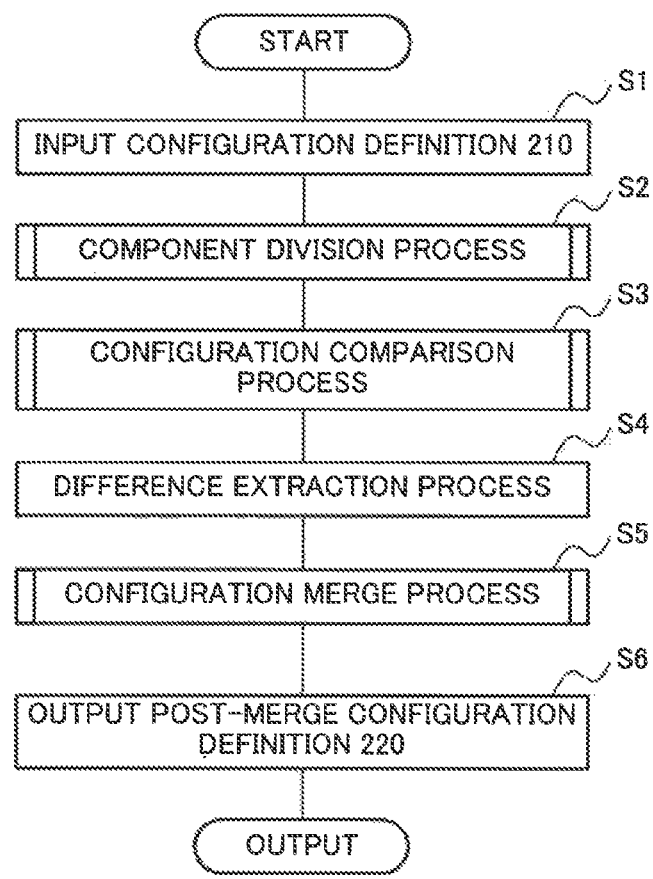
FIG. 4 is a flowchart illustrating an overall process of the difference detection device 100 in the first example embodiment of the present invention.

FIG. 4 is a flowchart illustrating an overall process of the difference detection device 100 in the first example embodiment of the present invention.

The configuration definition acquisition unit 110 receives inputting of configuration definitions 210 of two systems that are merge targets from the user or the like (step S1). The configuration definition acquisition unit 110 also receives, together therewith, a conflict resolution rule between two configuration definitions 210. The conflict resolution rule indicates, when the same setting item is conflicting (setting values are different) between two configuration definitions 210, which one of the setting items is used.

For example, the configuration definition acquisition unit 110 receives the configuration definitions 210 relating to the systems A and B, as in FIG. 8.

Alternatively, the configuration definition acquisition unit 110 may acquire configuration definitions 210 of two systems of merge targets among configuration definitions 210 stored on a configuration definition storage unit that is not illustrated.

The component division unit 130 executes a component division process (step S2). The component division process is a process for dividing the acquired configuration definition 210 of each system into pieces of configuration information of component units.

Figure 5:
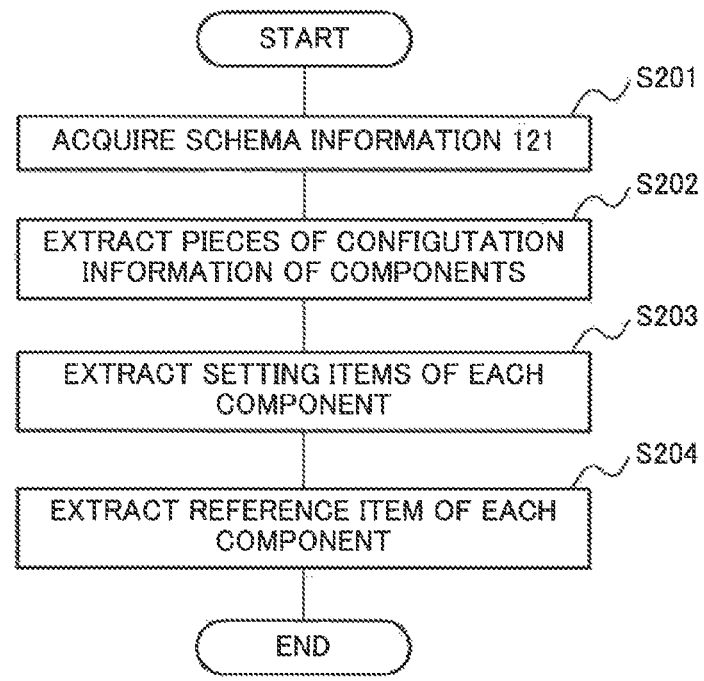
FIG. 5 is a flowchart illustrating details of a component division process (step S2) in the first example embodiment of the present invention.

FIG. 5 is a flowchart illustrating details of the component division process (step S2) in the first example embodiment of the present invention.

The component division unit 130 acquires schema information 121 from the schema information storage unit 120 (step S201).

The component division unit 130 extracts, in accordance with the schema information 121, pieces of configuration information of components from the configuration definition 210 of each system (step S202).

The component division unit 130 extracts setting items from the configuration information of each component (step S203).

The component division unit 130 further extracts a reference item from the extracted setting items of each component (step S204).

Figure 10:
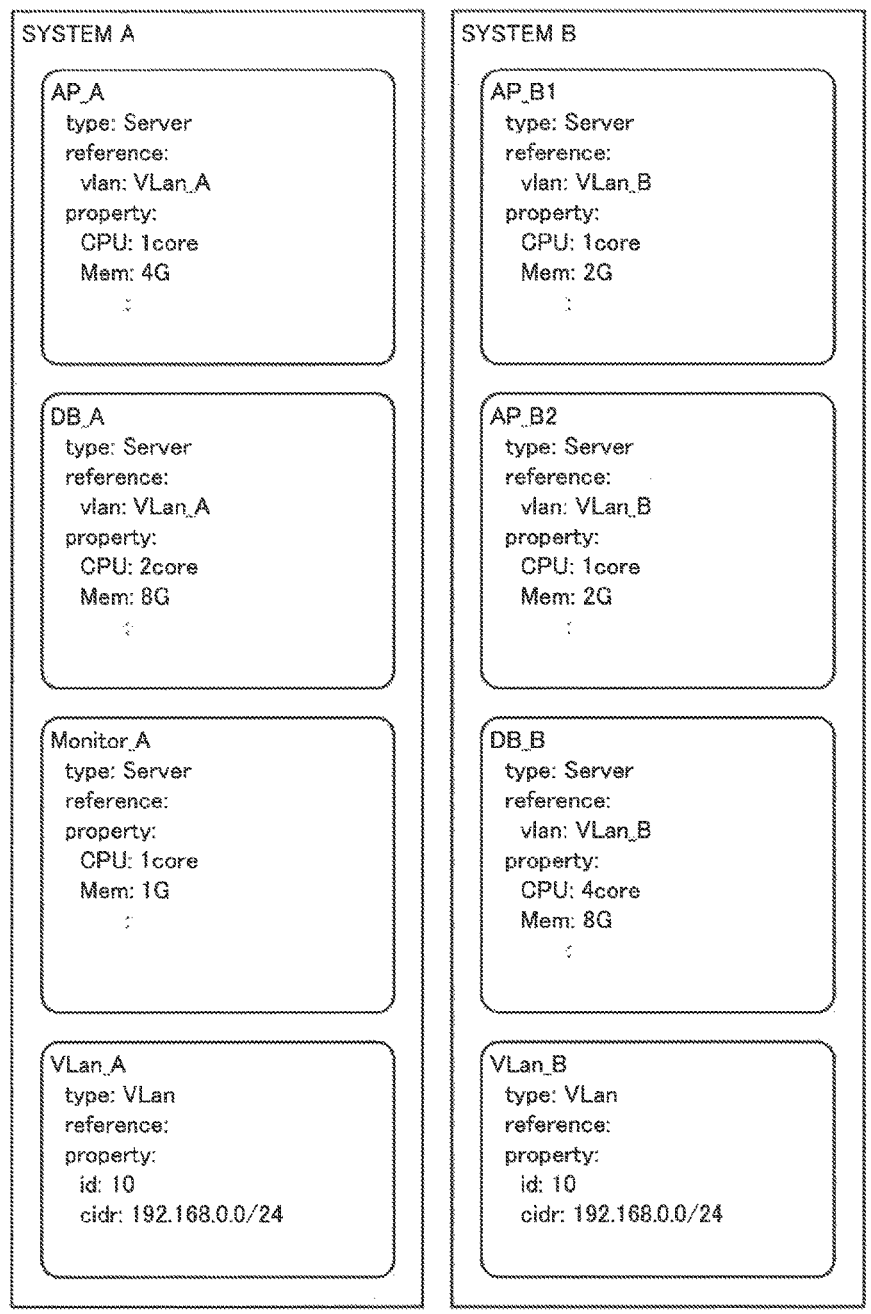
FIG. 10 is a diagram illustrating an example of a division result of the configuration definitions 210 in the first example embodiment of the present invention.

FIG. 10 is a diagram illustrating an example of a division result of the configuration definitions 210 in the first example embodiment of the present invention.

For example, the component division unit 130 refers to the schema information 121 of FIG. 9 and extracts pieces of configuration information of components of each of the systems A and B and setting items of each component from the configuration definitions 210 of FIG. 8, as in FIG. 10. Further, the component division unit 130 extracts a setting item "vlan" as a reference item ("reference" in FIG. 10) from the setting items of each component, as in FIG. 10.

The configuration comparison unit 140 executes a configuration comparison process (step S3). The configuration comparison process is a process for comparing the configuration definitions 210 divided in step S2 and classifying the components of each system into a component (a common component) to be a coupling point upon merge and a difference component other than the common component.

Figure 6:
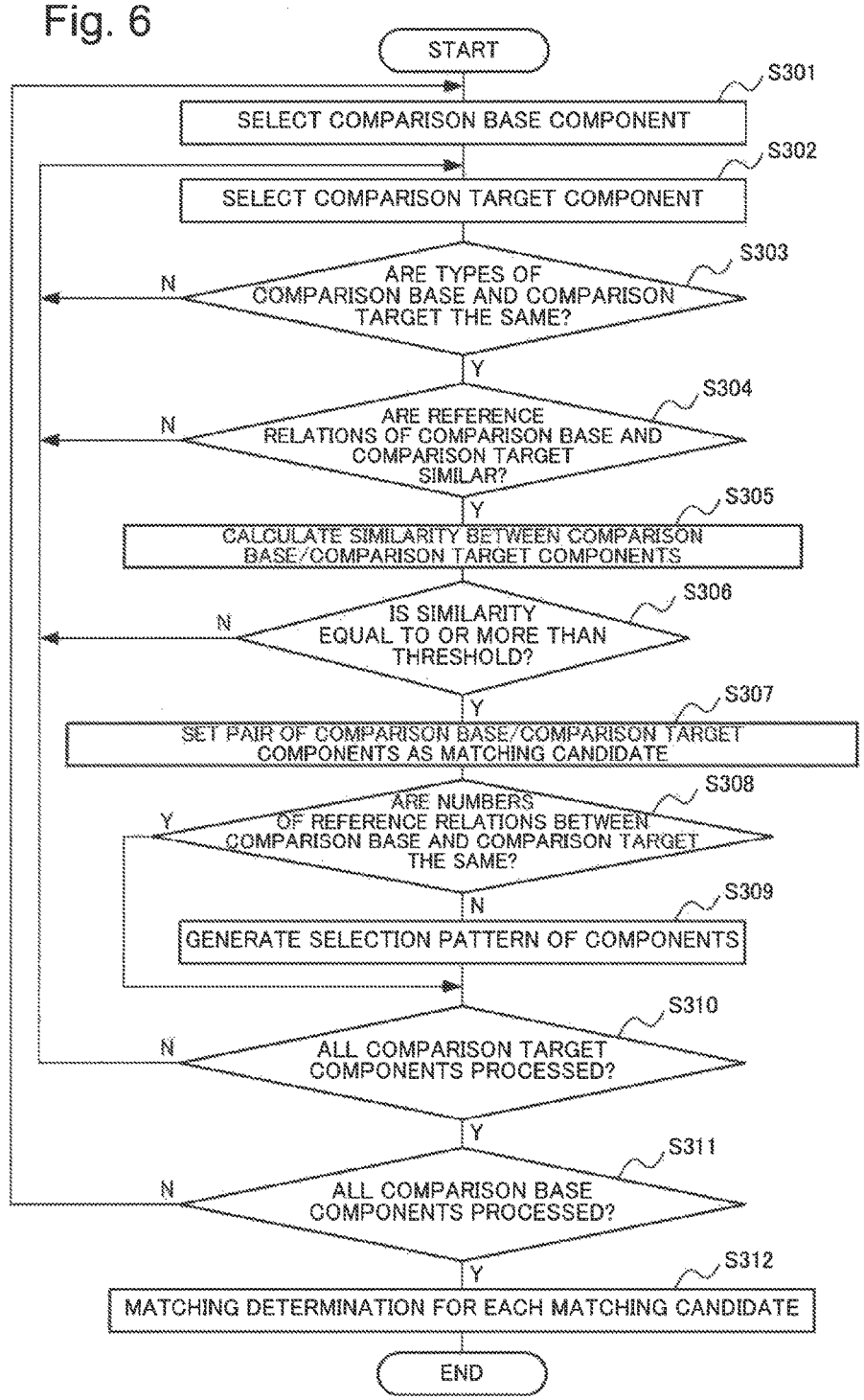
FIG. 6 is a flowchart illustrating details of a configuration comparison process (step S3) in the first example embodiment of the present invention.

FIG. 6 is a flowchart illustrating details of the configuration comparison process (step S3) in the first example embodiment of the present invention.

Of the input configuration definitions 210 of the two systems, one configuration definition 210 is referred to as the configuration definition 210 of a comparison base, and the other configuration definition 210 is referred to as the configuration definition 210 of a comparison target. It is noted that a result of the configuration comparison process is the same regardless of which one of the two configuration definitions 210 is designated as a comparison base.

The configuration comparison unit 140 selects one component (comparison base component) from the components extracted in step S2 for the configuration definition 210 of a comparison base (step S301).

In the same manner, the configuration comparison unit 140 selects one component (comparison target component) from the components extracted in step S2 for the configuration definition 210 of a comparison target (step S302).

The configuration comparison unit 140 determines whether types (values of a setting item "Type") of the comparison base component and the comparison target component are the same (step S303).

When the types are different in step S303 (step S303/N), processes from step S302 are repeated.

When the types are the same in step S303 (step S303/Y), the configuration comparison unit 140 determines whether reference relations are similar between the comparison base and comparison target components (step S304). The configuration comparison unit 140 compares, based on reference items of the comparison base and comparison target components, types of other components (reference target components) being referred to by the comparison base and comparison target components. Further, the configuration comparison unit 140 refers to reference items of the other components and compares types of the other components (reference base components) being referring to the comparison base and comparison target components. The configuration comparison unit 140 determines that the reference relations are similar when the types of the reference target components are the same and the types of the reference base components are the same between the comparison base and comparison target components.

When the reference relations are not similar in step S304 (step S304/N), processes from step S302 are repeated.

On the other hand, when the reference relations are similar in step S304 (step S304/Y), the configuration comparison unit 140 calculates a similarity between the comparison base and comparison target components (step S305). The configuration comparison unit 140 calculates, as the similarity, for example, a ratio of setting items having the same setting value or the number of matched characters of setting values between the comparison base and comparison target components. The configuration comparison unit 140 may calculate similarity using another method as long as it is a formulated method capable of quantifying similarity.

The configuration comparison unit 140 sets, when the similarity is equal to or more than a threshold (step S306/Y), the comparison base and comparison target components as a matching candidate (a candidate for a common component) (step S307). The threshold is used to prevent a pair of components not to be determined as successful matching from being erroneously determined as successful matching.

When the similarity is less than the threshold (step S306/N), processes from step S302 are repeated.

FIG. 11 is a diagram illustrating an example of a calculation result of similarities in the first example embodiment of the present invention.

When, for example, the configuration definition 210 of the system A is used as a comparison base configuration definition and the configuration definition 210 of the system B is used as a comparison target configuration definition, the configuration comparison unit 140 selects a comparison base component "AP_A" and a comparison target component "AP_B1". The components "AP_A" and "AP_B1" have the same type ("Server"). The component "AP_A" has a reference target component "VLan_A" of a type "VLan" and does not have a reference base component. In the same manner, the component "AP_B" has a reference target component "VLan_B" of a type "VLan" and does not have a reference base component. Therefore, the configuration comparison unit 140 determines that reference relations between the components "AP_A" and "AP_B1" are similar. The configuration comparison unit 140 calculates, as illustrated in FIG. 11, a similarity "0.9" for a pair of the components "AP_A" and "AP_B1". When a threshold for similarity is "0.6", the configuration comparison unit 140 sets the pair as a matching candidate <AP_A, AP_B1>. <AP_A, AP_B1> indicates a pair of the components "AP_A" and "AP_B1".

In the same manner, the configuration comparison unit 140 calculates, as illustrated in FIG. 11, similarities "0.8" and "0.6" for pairs of a comparison base component "AP_A" and comparison target components "AP_B2" and "DB_B", respectively. The configuration comparison unit 140 sets these pairs as matching candidates <AP_A, AP_B2> and <AP_A, DB_B>.

Further, the configuration comparison unit 140 calculates, as illustrated in FIG. 11, similarities "0.6", "0.6", and "0.9" for pairs of a comparison base component "DB_A" and comparison target components "AP_B1", "AP_B2", and "DB_B", respectively. The configuration comparison unit 140 sets these pairs as matching candidates <DB_A, AP_B 1>, <DB_A, AP_B2>, and <DB_A, DB_B>.

Further, the configuration comparison unit 140 calculates, as illustrated in FIG. 11, similarities "0.2", "0.3", and "0.2" for pairs of a comparison base component "Monitor_A" and comparison target components "AP_B1", "AP_B2", and "DB_B", respectively. In this case, the comparison base component "Monitor_A" is not set as a matching candidate.

Further, a comparison base component "VLan_A" and a comparison target component "VLan_B" have the same type ("Vlan"). The component "VLan_A" has reference base components "AP_A" and "DB_A" of a type "Server" and does not have a reference target component. The component "VLan_B" has reference base components "AP_B1", "AP_B2", and "DB_B" of a type "Server" and does not have a reference target component. Therefore, the configuration comparison unit 140 determines that reference relations between the components "VLan_A" and "VLan_B" are similar. The configuration comparison unit 140 calculates, as illustrated in FIG. 11, a similarity "0.9" for a pair of the components "VLan_A" and "VLan_B". The configuration comparison unit 140 sets this pair as a matching candidate <VLan_A, VLan_B>.

The configuration comparison unit 140 determines whether the numbers of reference relations are the same between the components set as the matching candidate (step S308). The configuration comparison unit 140 determines whether the numbers of reference target and reference base components are the same with respect to each type.

For example, with respect to the above-described matching candidate <AP_A, AP_B1>, the numbers of reference target components of a type "VLan" of the components "AP_A" and "AP_B1" are 1 and 1, respectively. Therefore, the configuration comparison unit 140 determines that the numbers of reference relations between the components "AP_A" and "AP_B1" are the same. In the same manner, the configuration comparison unit 140 determines that the numbers of reference relations are the same with respect to matching candidates <AP_A, AP_B2>, <AP_A, DB_B>, <DB_A, AP_B 1>, <DB_A, AP_B2>, and <DB_A, DB_B>.

Further, with respect to the above-described matching candidate <VLan_A, VLan_B>, the numbers of reference base components of a type "Server" of the components "VLan_A" and "VLan_B" are 2 and 3, respectively. Therefore, the configuration comparison unit 140 determines that the numbers of reference relations between the components "VLan_A" and "VLan_B" are different.

When the numbers of reference relations are the same in step S307 (step S308/Y), processes in and after step S310 are executed.

On the other hand, when the numbers of reference relations are different in step S307 (step S308/N), the configuration comparison unit 140 generates a selection pattern of components (step S309). The selection pattern is a set of components selected from the configuration definition 210 of a comparison base or a comparison target when matching determination is performed between components of a matching candidate. The configuration comparison unit 140 generates, from the configuration definition 210 in which the number of reference target or reference base components of a type is larger among components of a matching candidate, a set in which components of the type are extracted. The number of the extracted components is the number of reference target or reference base components of the type in the configuration definition 210 in which the number of reference target or reference base components of the type is smaller.

FIG. 12 is a diagram illustrating an example of selection patterns in the first example embodiment of the present invention.

For example, the configuration comparison unit 140 extracts, with respect to the matching candidate <VLan_A, VLan_B>, a set of components of a type "Server" from the configuration definition 210 of the system B in which the number of reference base components of the type "Server" is larger (three). The number of the extracted components is the number (two) of reference base components of a type "Server" in the configuration definition 210 of the system A in which the number of reference base components of the type "Server" is smaller (two). In other words, the configuration comparison unit 140 generates selection patterns <AP_B1, AP_B2>, <AP_B1, DB_B>, and <AP_B2, DB_B>, as illustrated in FIG. 12.

Processes from step S302 are repeated for all the components of the configuration definition 210 of a comparison target (step S310).

Further, processes from step S301 are repeated for all the components of the configuration definition 210 of a comparison base (step S311).

The configuration comparison unit 140 performs matching determination for each matching candidate (step S312). When neither of a pair of components set as a matching candidate is included in selection patterns, the configuration comparison unit 140 determines the matching candidate as successful matching (common component). Further, when there are a plurality of matching candidates relating to components not included in the selection patterns, the configuration comparison unit 140 determines a matching candidate having a maximum similarity as successful matching. The configuration comparison unit 140 sets a pair of components of the matching candidate determined as successful matching as a matching determination result, together with the determination result "successful matching (common component)".

FIG. 14 is a diagram illustrating an example of matching determination results in the first example embodiment of the present invention.

For example, the configuration comparison unit 140 determines the matching candidate <VLan_A, VLan_B> having a similarity of "0.9" among the matching candidates of FIG. 11 as successful matching (common component), and sets the determined result as a matching determination result as illustrated in FIG. 14.

Further, when either one of a pair of components set as a matching candidate is included in the selection patterns, the configuration comparison unit 140 calculates average values of similarities for sets of matching candidates able to be taken for the selection patterns. The configuration comparison unit 140 determines a set of matching candidates having a maximum average value as successful matching.

FIG. 13 is a diagram illustrating an example of a calculation result of similarities for each selection pattern in the first example embodiment of the present invention.

For example, the configuration comparison unit 140 calculates average values of similarities for respective sets of matching candidates able to be taken for each of the selection patterns <AP_B1, AP_B2>, <AP_B1, DB_B>, and <AP_B2, DB_B> of FIG. 12, as illustrated in FIG. 13. The configuration comparison unit 140 determines a set of the matching candidates <AP_A, AP_B1>, <DB_A, DB_B> having a maximum average value for the selection pattern <AP_B1, DB_B> as successful matching (common component), and sets the determined result as a matching determination result as illustrated in FIG. 14.

Further, the configuration comparison unit 140 sets a component which has not been determined as successful matching among components set as the matching candidates, as a matching determination result, together with a determination result "unsuccessful matching (difference component)". Further, the configuration comparison unit 140 also sets a component having not been set as a matching candidate among components of the configuration definitions 210 of a comparison base and a comparison target, as a matching determination result, together with a determination result "unsuccessful matching (difference component)", in the same manner.

For example, the configuration comparison unit 140 sets the component "Monitor_A" of the system A and the component "AP_B2" of the system B as unsuccessful matching (difference component), as a matching determination result, as illustrated in FIG. 14.

The configuration comparison unit 140 may output the matching determination results to the user or the like.

The difference extraction unit 150 executes a difference extraction process (step S4). The difference extraction process is a process for extracting, with respect to a pair of components determined as successful matching (common component), a conflicting setting item (setting item whose setting values are different).

FIG. 15 is a diagram illustrating an example of difference extraction results in the first example embodiment of the present invention.

For example, the difference extraction unit 150 extracts conflicting setting items as illustrated in FIG. 15, with respect to pairs of components <AP_A, AP_B1> and <DB_A, DB_B> determined as successful matching in the matching determination results of FIG. 14.

The difference extraction unit 150 may output the difference extraction results to the user or the like.

The configuration merge unit 160 executes a configuration merge process (step S5). The configuration merge process is a process for integrating (merging) the configuration definitions 210 of two systems.

Figure 7:
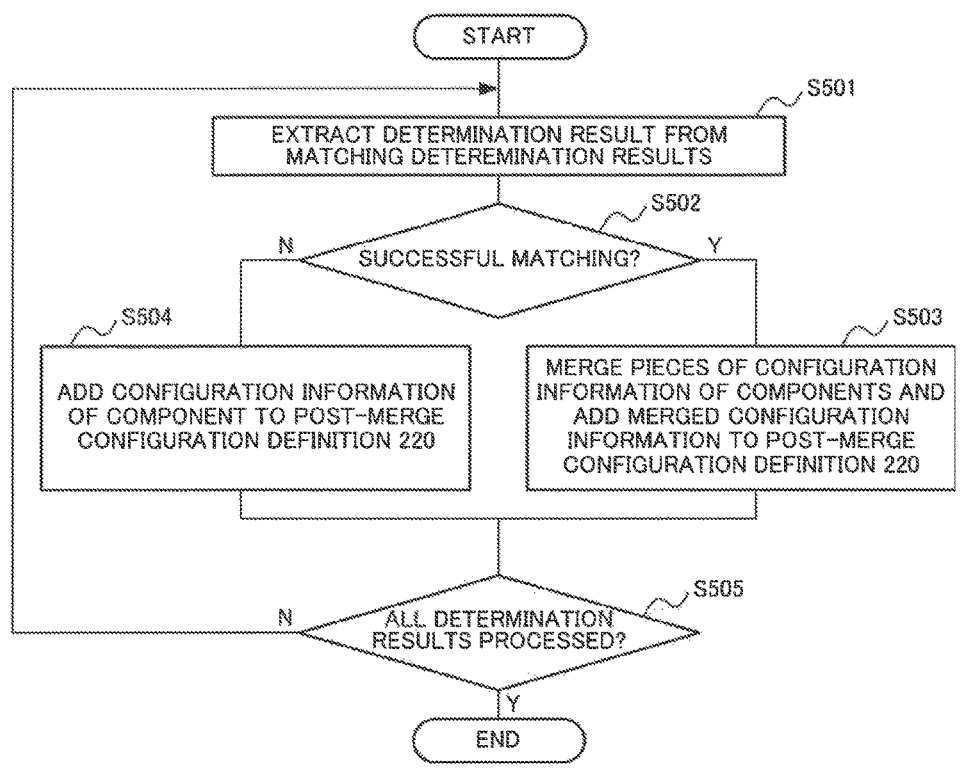
FIG. 7 is a flowchart illustrating details of a configuration merge process (step S5) in the first example embodiment of the present invention.

FIG. 7 is a flowchart illustrating details of the configuration merge process (step S5) in the first example embodiment of the present invention.

The configuration merge unit 160 extracts one record of a determination result from the matching determination results (step S501).

When the determination result is "successful matching" (step S502/Y), the configuration merge unit 160 merges pieces of configuration information for a pair of components with respect to the determination result and adds the merged configuration information to the post-merge configuration definition 220 (step S503). The configuration merge unit 160 resolves conflict of a conflicting setting item indicated by the difference extraction result, in accordance with a conflict resolution rule.

When the determination result is "unsuccessful matching" (step S502/N), the configuration merge unit 160 adds configuration information of a component with respect to the determination result to the post-merge configuration definition 220, as they are (step S504).

Further, when an identifier of a component is changed due to merge of pieces of configuration information of components, the configuration merge unit 160 also changes a setting value of a setting item of a reference base component of the component.

The configuration merge unit 160 repeats processes from step S501 with respect to records of all determination results included in the matching determination results (step S505).

Figure 16:
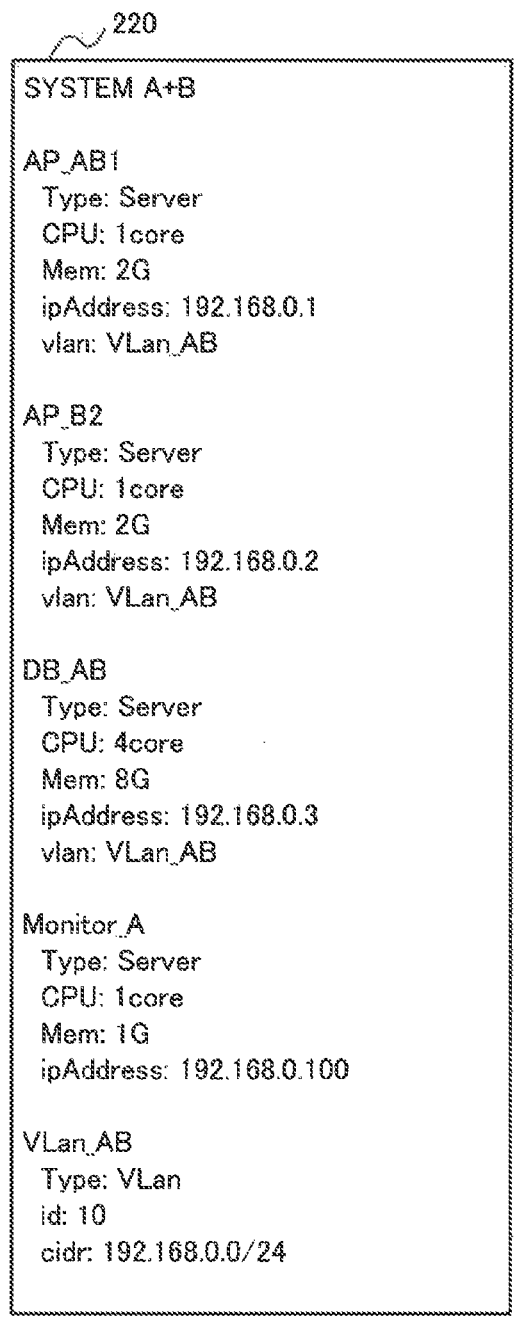
FIG. 16 is a diagram illustrating an example of a post-merge configuration definition 220 in the first example embodiment of the present invention.

FIG. 16 is a diagram illustrating an example of the post-merge configuration definition 220 in the first example embodiment of the present invention.

For example, the configuration merge unit 160 adds, with respect to a pair of components <AP_A, AP_B1>, configuration information of a component "AP_AB1" to the post-merge configuration definition 220, as illustrated in FIG. 16. When the conflict resolution rule is "a setting value of the system B is prioritized", a setting value "2G" of the component "AP_B1" is set for a setting item "Mem" that is conflicting between the components <AP_A, AP_B1>. Further, the configuration merge unit 160 adds configuration information of a component "DB_AB" with respect to a pair of components <DB_A, DB_B> and configuration information of a component <VLan_AB> with respect to a pair of components <VLan_A, VLan_B>.

Further, the configuration merge unit 160 adds pieces of configuration information of components "AP_B2" and "Monitor_A" to the post-merge configuration definition 220, as illustrated in FIG. 16.

Further, the configuration merge unit 160 changes a setting value of a setting item "vlan" of each component to "VLan_AB", as illustrated in FIG. 16.

The configuration merge unit 160 outputs the post-merge configuration definition 220 to the user or the like (S6).

Note that a deployment unit or the like, not illustrated, may construct a merged system by performing deployment of components on another computer, not illustrated, and setting of the components, in accordance with the post-merge configuration definition 220.

As described above, the operations of the first example embodiment of the present invention are completed.

Next, a characteristic configuration of the first example embodiment of the present invention will be described. FIG. 1 is a block diagram illustrating a characteristic configuration of the first example embodiment of the present invention.

Referring to FIG. 1, a difference detection device 100 (an information processing apparatus) includes a configuration definition acquisition unit 110 and a configuration comparison unit 140.

The configuration definition acquisition unit 110 acquires, with respect to different systems, configuration definitions 210 each including components of a system and a reference relation between the components.

The configuration comparison unit 140 classifies, based on the reference relation between the components in each configuration definition 210, the components in the configuration definition 210 of each of the different systems into a common component and a difference component between the different systems, and outputs a result of classification.

According to the first example embodiment of the present invention, it is possible to extract a difference between configuration definition files of information systems, efficiently. The reason is that the configuration comparison unit 140 classifies, based on a reference relation between components in each configuration definition 210 of different systems, components in each configuration definition 210 into a common component and a difference component between the systems.

Further, according to the first example embodiment of the present invention, it is possible to merge configuration definition files of two systems including a common component, easily. The reason is that the configuration merge unit 160 generates a post-merge configuration definition 220 including configuration information of a common component and configuration information of a difference component between systems.

Thereby, a designer of a system may obtain, without analysis of configuration definition files of different systems to be merged, a merged configuration definition file merely by inputting the configuration definition files and a conflict resolution rule.

Second Example Embodiment

Next, a second example embodiment of the present invention will be described.

The second example embodiment of the present invention is different from the first example embodiment of the present invention in that, instead of using a conflict resolution rule that has been input in advance, conflict is resolved interactively with the user.

Figure 17:
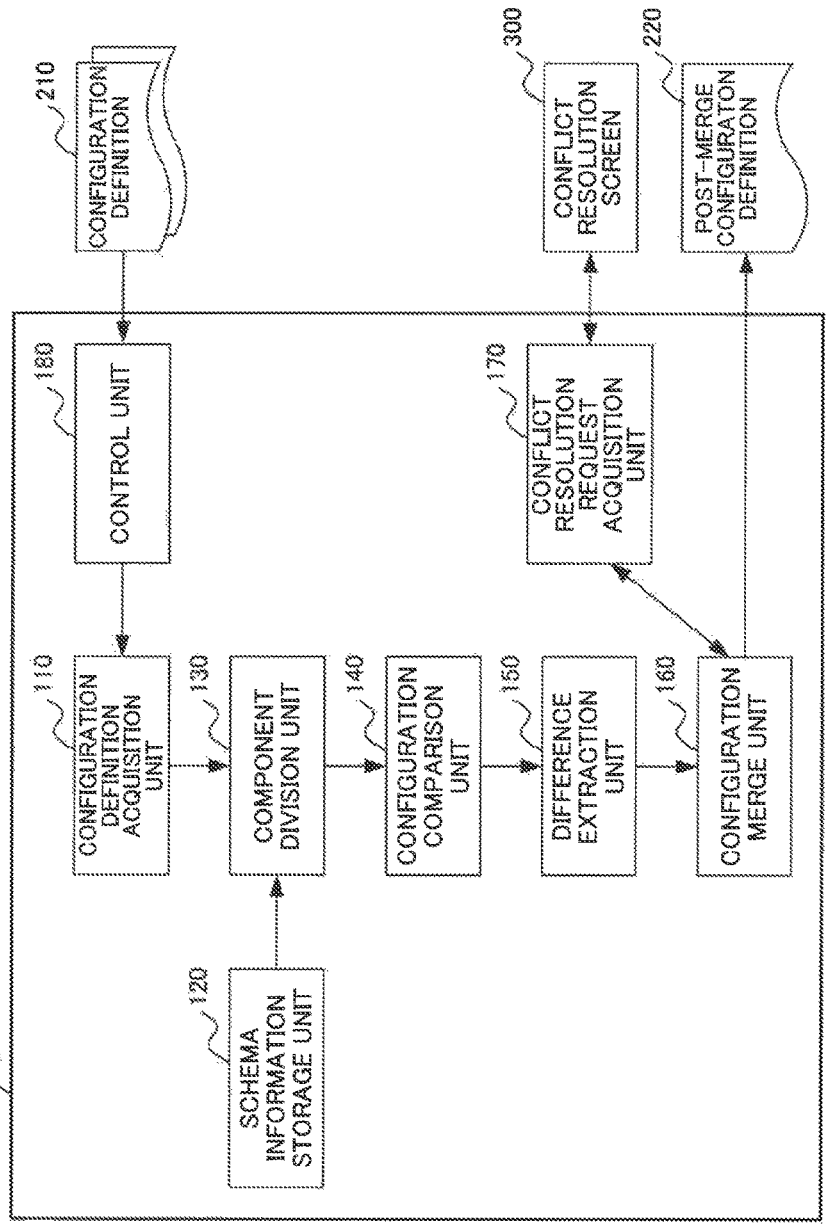
FIG. 17 is a block diagram illustrating a configuration of a difference detection device 100 in a second example embodiment of the present invention.

FIG. 17 is a block diagram illustrating a configuration of a difference detection device 100 in the second example embodiment of the present invention.

Referring to FIG. 17, the difference detection device 100 of the second example embodiment of the present invention further includes a conflict resolution request acquisition unit 170, in addition to the configuration of the first example embodiment of the present invention.

The conflict resolution request acquisition unit 170 outputs, in step S503 described above, a conflict resolution screen 300 to the user or the like and receives inputting of a conflict resolution request.

Figure 18:
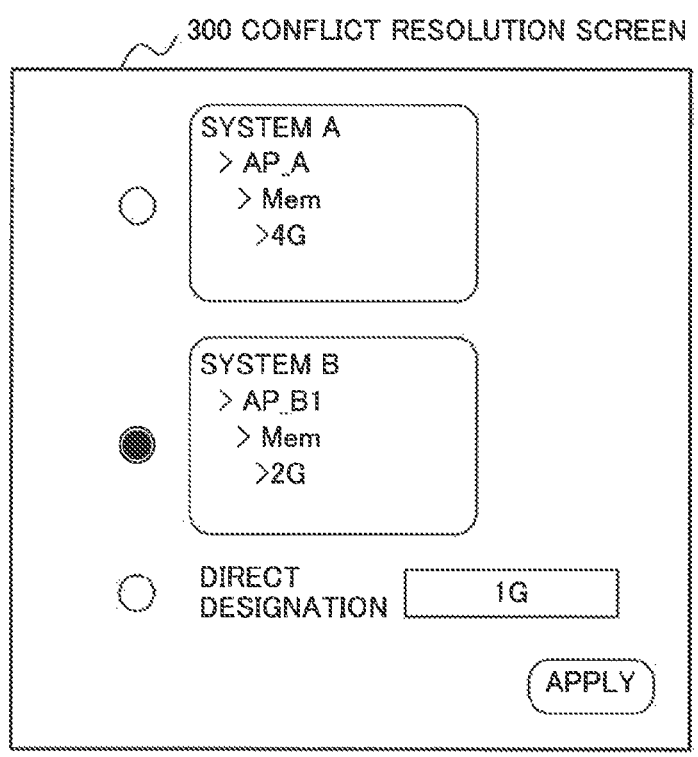
FIG. 18 is a diagram illustrating an example of a conflict resolution screen 300 in the second example embodiment of the present invention.

FIG. 18 is a diagram illustrating an example of the conflict resolution screen 300 in the second example embodiment of the present invention. The conflict resolution screen 300 indicates a conflicting setting item between components which have been determined as successful matching and setting values of the conflict setting item. In the conflict resolution screen 300, the user selects which setting value of the components to use for the conflicting setting item between the components. Further, the user may directly input a setting value of the conflicting setting item in the conflict resolution screen 300.

The conflict resolution request acquisition unit 170 outputs the conflict resolution screen 300 for each conflicting setting item. A setting value of each setting item acquired by the conflict resolution request acquisition unit 170 is reflected in the post-merge configuration definition 220 by the configuration merge unit 160.

Alternatively, the conflict resolution request acquisition unit 170 may output the conflict resolution screen 300 of a setting item for which conflict is not able to be resolved by a conflict resolution rule, among conflicting setting items.

According to the second example embodiment of the present invention, even when it is difficult to define conflict resolution rules, conflict is resolved quickly.

Third Example Embodiment

Next, a third example embodiment of the present invention will be described.

The third example embodiment of the present invention is different from the first example embodiment of the present invention in that configuration definitions 210 of three or more systems are merged.

Figure 19:
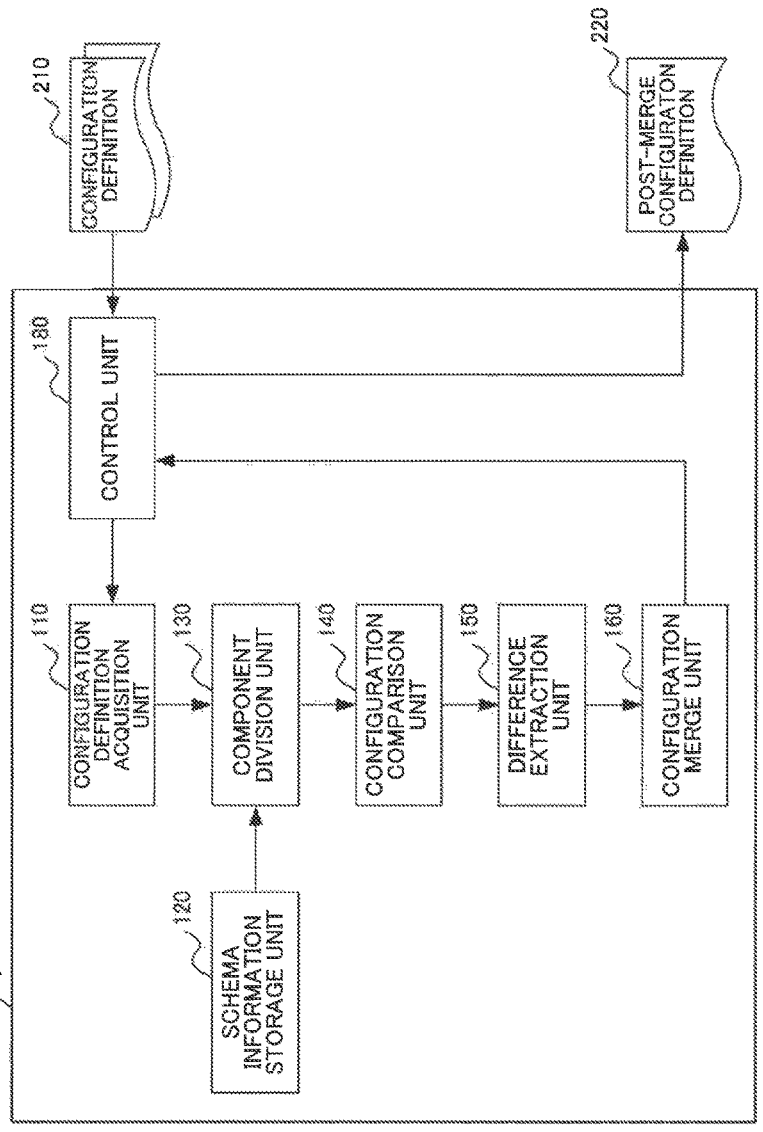
FIG. 19 is a block diagram illustrating a configuration of a difference detection device 100 in a third example embodiment of the present invention.

FIG. 19 is a block diagram illustrating a configuration of a difference detection device 100 in the third example embodiment of the present invention.

Referring to FIG. 19, the difference detection device 100 of the third example embodiment of the present invention further includes a control unit 180, in addition to the configuration of the first example embodiment of the present invention.

The control unit 180 receives inputting of configuration definitions 210 of three or more systems from the user or the like, selects two configuration definitions 210 among the received configuration definitions 210, and transmits the selected configuration definitions 210 to the configuration definition acquisition unit 110. Thereby, in the same manner as in the first example embodiment of the present invention, the two configuration definitions 210 are merged by the configuration comparison unit 140, the difference extraction unit 150, and the configuration merge unit 160, and the post-merge configuration definition 220 is generated. The post-merge configuration definition 220 is transmitted to the control unit 180.

When there are un-merged configuration definitions 210, the control unit 180 repeats selecting one configuration definition 210 among the un-merged configuration definitions 210 and transmitting the selected configuration definition 210 to the configuration definition acquisition unit 110, together with the post-merge configuration definition 220. Thereby, generation of a new post-merge configuration definition 220 is repeated based on merge of the un-merged configuration definition 210 and the post-merge configuration definition 220 using the configuration comparison unit 140, the difference extraction unit 150, and the configuration merge unit 160.

When there is no remaining un-merged configuration definition 210, the control unit 180 outputs the post-merge configuration definition 220 (the post-merge configuration definition 220 in which all the configuration definitions 210 of the three or more systems are merged).

According to the third example embodiment of the present invention, it is possible to merge configuration definition files of three or more systems including a common component, easily. The reason is that the configuration merge unit 160 repeats merging, in accordance with a request from the control unit 180, a post-merge configuration definition 220 and an un-merged configuration definition 210 after merging two configuration definitions 210 among configuration definitions 210 of a plurality of systems.

While the present invention has been particularly shown and described with reference to example embodiments thereof, the present invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to an editing tool for editing a configuration definition file of an information system. Further, the present invention is also applicable to a design tool for designing a desired system by combining design patterns of systems.

This application is based upon and claims the benefit of priority from Japanese Patent Application No. 2014-206949, filed on Oct. 8, 2014, the disclosure of which is incorporated herein in its entirety by reference.

REFERENCE SIGNS LIST

100 Difference detection device
101 CPU
102 Storage means
103 Communication means
104 Input means
105 Output means
110 Configuration definition acquisition unit
120 Schema information storage unit
121 Schema information
130 Component division unit
140 Configuration comparison unit
150 Difference extraction unit
160 Configuration merge unit
170 Conflict resolution request acquisition unit
180 Control unit 210 Configuration definition
220 Post-merge configuration definition
300 Conflict resolution screen

The invention claimed is:

1. An information processing apparatus comprising:
a memory storing instructions; and
one or more hardware processors configured to execute the instructions to:
acquire, with respect to each of different systems, a configuration definition including components of corresponding one of the different systems and a reference relation between the components,
classify, by comparing a reference relation between components in a configuration definition of one of the different systems with a reference relation between components in a configuration definition of another of the different systems, the components in the configuration definition of each of the different systems into a common component and a difference component between the different systems, and output information indicating the common component and the difference component,
merge configuration definitions of the different systems, by generating a new configuration definition including the common component and the difference component between the different systems,
when values of a setting item of components in the new configuration definition generated by the merging are different between components determined as the common component of the different systems, use a first value of the setting item of the component of one system as a value of the setting item of the common component in the new configuration definition, in accordance with a predetermined rule or an input request, and
construct a merged system by deploying components on a computer in accordance with the new configuration definition including the first value.

2. The information processing apparatus according to claim 1, wherein
the one or more hardware processors are configured to execute the instructions to determine whether a component of a first system and a component of a second system are the common component based on a similarity between the component of the first system and the component of the second system, the component of the first system and the component of the second system each having a reference relation with another component of a same type.

3. The information processing apparatus according to claim 1, wherein
the one or more hardware processors are configured to execute the instructions to determine, when a first reference number that is a number of components of a second type having a reference relation with a component of a first type in a first system is smaller than a second reference number that is a number of components of the second type having a reference relation with a component of the first type in a second system, based on a similarity between a set of the components of the first reference number of the second type in the first system and a set of components of the first reference number among the components of the second type in the second system, whether the set of the components of the first reference number of the second type in the first system and the set of the components of the first reference number of the second type in the second system are a set of common components.

4. The information processing apparatus according to claim 1, wherein
the one or more hardware processors are configured to execute the instructions to merge configuration definitions of a plurality of systems by, after merging configuration definitions of two systems among the configuration definitions of the plurality of systems, repeating merging the new configuration definition generated by the merging and a configuration definition not merged among the configuration definitions of the plurality of systems.

5. An information processing method comprising:
acquiring, with respect to each of different systems, a configuration definition including components of corresponding one of the different systems and a reference relation between the components; and
classifying, by comparing a reference relation between components in a configuration definition of one of the different systems with a reference relation between components in a configuration definition of another of the different systems, the components in the configuration definition of each of the different systems into a common component and a difference component between the different systems, and outputting information indicating the common component and the difference component;
merging configuration definitions of the different systems, by generating a new configuration definition including the common component and the difference component between the different systems;
when values of a setting item of components in the new configuration definition generated by the merging are different between components determined as the common component of the different systems, using a first value of the setting item of the component of one system as a value of the setting item of the common component in the new configuration definition, in accordance with a predetermined rule or an input request; and
constructing a merged system by deploying components on a computer in accordance with the new configuration definition including the first value.

6. The information processing method according to claim 5, wherein,
when classifying the components in the configuration definition, whether a component of a first system and a component of a second system are the common component is determined based on a similarity between the component of the first system and the component of the second system, the component of the first system and the component of the second system each having a reference relation with another component of a same type.

7. A non-transitory computer readable storage medium recording thereon a program causing a computer to perform a method comprising:
acquiring, with respect to each of different systems, a configuration definition including components of corresponding one of the different systems and a reference relation between the components; and
classifying, by comparing a reference relation between components in a configuration definition of one of the different systems with a reference relation between components in a configuration definition of another of the different systems, the components in the configuration definition of each of the different systems into a common component and a difference component between the different systems, and outputting information indicating the common component and the difference component;
merging configuration definitions of the different systems, by generating a new configuration definition including the common component and the difference component between the different systems;
when values of a setting item of components in the new configuration definition generated by the merging are different between components determined as the common component of the different systems, using a first value of the setting item of the component of one system as a value of the setting item of the common component in the new configuration definition, in accordance with a predetermined rule or an input request; and
constructing a merged system by deploying components on a computer in accordance with the new configuration definition including the first value.

8. The non-transitory computer readable storage medium recording thereon the program according to claim 7 causing the computer to perform the method, wherein, when classifying the components in the configuration definition, whether a component of a first system and a component of a second system are the common component is determined based on a similarity between the component of the first system and the component of the second system, the component of the first system and the component of the second system each having a reference relation with another component of a same type.

* * * * *